United States Patent
Zhang et al.

(10) Patent No.: US 10,128,528 B2
(45) Date of Patent: Nov. 13, 2018

(54) COMBINATORIAL CHEMISTRIES FOR MATCHING MULTIPLE BATTERIES

(71) Applicant: Johnson Controls Technology Company, Holland, MI (US)

(72) Inventors: Zhenli Zhang, Glendale, WI (US); Brian C. Sisk, Mequon, WI (US); Thomas M. Watson, Milwaukee, WI (US)

(73) Assignee: Johnson Controls Technology Company, Auburn Hills, MI (US)

( * ) Notice: Subject to any disclaimer, the term of this patent is extended or adjusted under 35 U.S.C. 154(b) by 469 days.

(21) Appl. No.: 14/578,002

(22) Filed: Dec. 19, 2014

(65) Prior Publication Data
US 2015/0188188 A1    Jul. 2, 2015

Related U.S. Application Data

(60) Provisional application No. 61/923,118, filed on Jan. 2, 2014.

(51) Int. Cl.
*H01M 10/0525*    (2010.01)
*B60L 11/18*    (2006.01)
(Continued)

(52) U.S. Cl.
CPC ......... *H01M 10/0525* (2013.01); *B60L 11/18* (2013.01); *B60L 11/1855* (2013.01); *B60L 11/1862* (2013.01); *B60L 11/1866* (2013.01); *B60L 11/1868* (2013.01); *B60L 11/1874* (2013.01); *B60L 11/1877* (2013.01);
(Continued)

(58) Field of Classification Search
CPC ............. B60L 11/1855; B60L 11/1862; B60L 11/1866; B60L 11/1868; B60L 11/1877; H01M 10/0525; H01M 10/058; H01M 10/4264; H01M 2/1077; H01M 16/00
See application file for complete search history.

(56) References Cited

U.S. PATENT DOCUMENTS

| | | |
|---|---|---|
| 7,973,511 B2 | 7/2011 | Choksi et al. |
| 8,396,609 B2 | 3/2013 | Wang et al. |

(Continued)

OTHER PUBLICATIONS

International Search Report & Written Opinion for International Application No. PCT/US2014/071884 dated Apr. 10, 2015.

*Primary Examiner* — Jonathan G Jelsma
(74) *Attorney, Agent, or Firm* — Fletcher Yoder P.C.

(57) ABSTRACT

A micro-hybrid battery system includes a lithium ion battery module configured to be coupled to an electrical load. The lithium ion battery module includes a housing. The lithium ion battery module also includes a first lithium ion battery cell disposed in the housing and having a first active material chemistry including a first cathode active material and a first anode active material. The lithium ion battery module also includes a second lithium ion battery cell electrically connected to the first lithium ion battery cell and disposed in the housing. The second lithium ion battery cell has a second active material chemistry including a second cathode active material and a second anode active material. The first and second active material chemistries are different such that the first and second lithium ion battery cells have different open circuit voltages.

14 Claims, 4 Drawing Sheets

(51) Int. Cl.
  *H01M 2/10* (2006.01)
  *H01M 10/058* (2010.01)
  *H01M 10/06* (2006.01)
  *H01M 4/131* (2010.01)
  *H01M 4/133* (2010.01)
  *H01M 10/42* (2006.01)
  *H01M 16/00* (2006.01)
  *H01M 4/485* (2010.01)
  *H01M 4/525* (2010.01)
  *H01M 4/587* (2010.01)

(52) U.S. Cl.
  CPC ......... *H01M 2/1077* (2013.01); *H01M 4/131* (2013.01); *H01M 4/133* (2013.01); *H01M 10/058* (2013.01); *H01M 10/06* (2013.01); *H01M 10/4264* (2013.01); *H01M 16/00* (2013.01); *B60L 2240/545* (2013.01); *B60L 2240/547* (2013.01); *B60L 2240/549* (2013.01); *H01M 4/485* (2013.01); *H01M 4/525* (2013.01); *H01M 4/587* (2013.01); *H01M 2220/20* (2013.01); *Y02E 60/122* (2013.01); *Y02E 60/126* (2013.01); *Y02P 70/54* (2015.11); *Y02T 10/7011* (2013.01); *Y02T 10/7016* (2013.01); *Y02T 10/7044* (2013.01); *Y02T 10/7061* (2013.01); *Y02T 10/7066* (2013.01); *Y10T 29/49108* (2015.01)

(56) References Cited

U.S. PATENT DOCUMENTS

| | | | |
|---|---|---|---|
| 8,598,847 B2 | 12/2013 | Eberhard et al. | |
| 8,786,261 B2 | 7/2014 | Andrea | |
| 2006/0208692 A1 | 9/2006 | Kejha | |
| 2007/0166607 A1* | 7/2007 | Okada | H01M 10/0525 429/90 |
| 2009/0246561 A1 | 10/2009 | Johnson et al. | |
| 2010/0225325 A1* | 9/2010 | Christensen | G01R 31/3624 324/426 |
| 2011/0020687 A1 | 1/2011 | Elliott et al. | |
| 2011/0086248 A1* | 4/2011 | Nakura | H01M 2/0267 429/9 |
| 2011/0135972 A1* | 6/2011 | Paulsen | H01M 10/441 429/9 |
| 2012/0169129 A1 | 7/2012 | Kim et al. | |
| 2012/0235473 A1 | 9/2012 | Jiang et al. | |
| 2014/0176045 A1 | 6/2014 | Naskali et al. | |
| 2014/0186659 A1 | 7/2014 | Dhar et al. | |
| 2014/0265554 A1* | 9/2014 | Yang | B60L 11/1868 307/9.1 |
| 2015/0005996 A1* | 1/2015 | Bergkoetter | B60L 11/1861 701/22 |
| 2015/0097518 A1 | 4/2015 | Bishop et al. | |

\* cited by examiner

COMBINATORIAL CHEMISTRIES FOR MATCHING MULTIPLE BATTERIES

CROSS REFERENCE TO RELATED APPLICATION

This application claims priority from and the benefit of U.S. Provisional Application Ser. No. 61/923,118, entitled "COMBINATORIAL CHEMISTRIES FOR MATCHING THE VOLTAGE OF MULTIPLE ENERGY STORAGE SOURCES", filed Jan. 2, 2014, which is hereby incorporated by reference in its entirety.

BACKGROUND

The present disclosure relates generally to the field of batteries and battery modules. More specifically, the present disclosure relates to active material in lithium ion electrochemical cells.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

A vehicle that uses one or more battery systems for providing all or a portion of the motive power for the vehicle can be referred to as an xEV, where the term "xEV" is defined herein to include all of the following vehicles, or any variations or combinations thereof, that use electric power for all or a portion of their vehicular motive force. For example, xEVs include electric vehicles (EVs) that utilize electric power for all motive force. As will be appreciated by those skilled in the art, hybrid electric vehicles (HEVs), also considered xEVs, combine an internal combustion engine propulsion system and a battery-powered electric propulsion system, such as 48 Volt (V) or 130V systems. The term HEV may include any variation of a hybrid electric vehicle. For example, full hybrid systems (FHEVs) may provide motive and other electrical power to the vehicle using one or more electric motors, using only an internal combustion engine, or using both. In contrast, mild hybrid systems (MHEVs) disable the internal combustion engine when the vehicle is idling and utilize a battery system to continue powering the air conditioning unit, radio, or other electronics, as well as to restart the engine when propulsion is desired. The mild hybrid system may also apply some level of power assist, during acceleration for example, to supplement the internal combustion engine. Mild hybrids are typically 96V to 130V and recover braking energy through a belt or crank integrated starter generator. Further, a micro-hybrid electric vehicle (mHEV) also uses a "Stop-Start" system similar to the mild hybrids, but the micro-hybrid systems of a mHEV may or may not supply power assist to the internal combustion engine and operates at a voltage below 60V. For the purposes of the present discussion, it should be noted that mHEVs typically do not technically use electric power provided directly to the crankshaft or transmission for any portion of the motive force of the vehicle, but an mHEV may still be considered as an xEV since it does use electric power to supplement a vehicle's power needs when the vehicle is idling with internal combustion engine disabled and recovers braking energy through an integrated starter generator. In addition, a plug-in electric vehicle (PEV) is any vehicle that can be charged from an external source of electricity, such as wall sockets, and the energy stored in the rechargeable battery packs drives or contributes to drive the wheels. PEVs are a subcategory of EVs that include all-electric or battery electric vehicles (BEVs), plug-in hybrid electric vehicles (PHEVs), and electric vehicle conversions of hybrid electric vehicles and conventional internal combustion engine vehicles.

xEVs as described above may provide a number of advantages as compared to more traditional gas-powered vehicles using only internal combustion engines and traditional electrical systems, which are typically 12V systems powered by a lead acid battery. For example, xEVs may produce fewer undesirable emission products and may exhibit greater fuel efficiency as compared to traditional internal combustion vehicles and, in some cases, such xEVs may eliminate the use of gasoline entirely, as is the case of certain types of EVs or PEVs.

As technology continues to evolve, there is a need to provide improved power sources, particularly battery modules, for such vehicles. For example, a battery system may include multiple battery modules that may be connected with one another using a variety of connecting strategies. In many such systems, battery modules may incorporate battery cells of a certain configuration to achieve a desired result for the battery modules. For example, cell sizes, shapes, chemistries, terminal configurations, and so on, may be chosen for a specific application. Unfortunately, many battery systems are constrained to one specific battery cell configuration, which can hinder design flexibility. For example, it is now recognized that the design flexibility of a battery module in a battery system may be limited due to the choice of battery cells having the same cell chemistry. Accordingly, it may be desirable to provide more design opportunities of a battery module.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure relates to a micro-hybrid battery system. The micro-hybrid battery system includes a lithium ion battery module configured to be coupled to an electrical load. The lithium ion battery module includes a housing. The lithium ion battery module also includes a first lithium ion battery cell disposed in the housing and having a first active material chemistry including a first cathode active material and a first anode active material. The lithium ion battery module also includes a second lithium ion battery cell electrically connected to the first lithium ion battery cell and disposed in the housing. The second lithium ion battery cell has a second active material chemistry including a second cathode active material and a second anode active material. The first and second active material chemistries are different such that the first and second lithium ion battery cells have different open circuit voltages.

The present disclosure also relates to a micro-hybrid battery system. The micro-hybrid battery system includes a first battery module. The micro-hybrid battery system also includes a lithium ion battery module electrically connected in parallel with the first battery module and including multiple groups of lithium ion battery cells and multiple different lithium ion battery chemistries. Each of the multiple groups of lithium ion battery cells corresponds to one of the multiple different lithium ion battery chemistries. The first battery module and the lithium ion battery module are voltage matched.

The present disclosure further relates to a method for manufacturing a battery system. The method includes assembling multiple lithium ion battery cells into a lithium ion battery module such that a first lithium ion battery cell of the multiple lithium ion battery cells comprises a different lithium ion battery chemistry from a second lithium ion battery cell of the multiple lithium ion battery cells. Assembling the multiple lithium ion battery cells into the lithium ion battery module includes electrically connecting the first lithium ion battery cell and the second lithium ion battery cell. The method also includes electrically connecting the lithium ion battery module with an additional battery module in parallel. The multiple lithium ion battery cells are configured such that the lithium ion battery module is voltage matched with the additional battery module.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present techniques will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As discussed above, vehicle technology has improved to increase fuel economy and/or reduce undesirable emissions compared to more traditional gas-powered vehicles. For example, micro-hybrid vehicles disable the vehicle's internal combustion engine when the vehicle is idling. While the vehicle's internal combustion engine is disabled, the battery system may continue supplying power to the vehicle's electrical system, which may include the vehicle's radio, air conditioning, electronic control units, and the like. Additionally, regenerative braking vehicles capture and store electrical power generated when the vehicle is braking or coasting. In some embodiments, the generated electrical power may then be utilized to supply power to the vehicle's electrical system. In other embodiments, the generated electrical power may be utilized to stabilize voltage during high demand, for example in regenerative storage systems.

Based on the advantages over traditional gas-power vehicles, manufactures, which generally produce traditional gas-powered vehicles, may desire to utilize improved vehicle technologies (e.g., micro-hybrid technology or regenerative braking technology) within their vehicle lines. These manufactures often utilize one of their traditional vehicle platforms as a starting point. Generally, traditional gas-powered vehicles are designed to utilize 12 V battery systems (e.g., operating voltages between 7-18 V), such as a single 12 V lead-acid battery. Accordingly, since traditional gas-powered vehicles are designed to utilize 12 V battery systems, a 12 V lithium ion battery may be used to supplement a 12 V lead-acid battery. More specifically, the 12 V lithium ion battery may be used to more efficiently capture electrical energy generated during regenerative braking and subsequently supply electrical energy to power the vehicle's electrical system. Additionally, in a mHEV, the internal combustion engine may be disabled when the vehicle is idle. Accordingly, the 12 V lithium ion battery may be used to crank (e.g., restart) the internal combustion engine when propulsion is desired.

Present embodiments include physical battery module features, assembly components, manufacturing and assembling techniques, and so forth, that facilitate providing more design opportunities for battery modules and systems, especially for 12 V battery systems, using a combination of lithium ion chemistries. As used herein, "battery module" is intended to describe energy storage devices that utilize various chemical reactions to store and/or distribute electrical power. As will be described in more detail below, a battery system may include a first battery module (e.g., a lead-acid battery) and a second battery module (e.g., a lithium ion battery). Each battery module may include multiple battery cells (e.g., connected with one another in series, in parallel, or a combination thereof). For example, a 12 V lithium ion battery may include six in-series lithium nickel manganese cobalt oxide/lithium-titanate (NMC/LTO) lithium ion battery cells, each of which may have a voltage range of about 2 to 2.8 V. Characteristics, such as a voltage profile (e.g., open circuit voltage as a function of state of charge), of each battery module may depend on the configuration of battery cells within each battery module (e.g., in series or parallel) and the battery chemistries selected for the battery cells.

To facilitate supplementing the first battery module with the second battery module, the first battery module and the second battery module may be connected in various parallel architectures. For example, the battery system may utilize a passive architecture, where the first battery module and the second battery module may be directly coupled to terminals of a vehicle bus. When the first battery module and the second battery module are connected in parallel, the two battery modules may be voltage matched for operation. For example, a voltage profile of the second battery module may overlap with a voltage window of the first battery module within an operating window of a battery system in which the first battery module and the second battery module are intended to function. In accordance with certain aspects of the present disclosure, the voltage window of the first battery module may be determined by a state of charge (SOC) range in which the first battery module is operated within the battery system. In such embodiments, the second battery module is considered to be "voltage matched" to the first battery module when the overlap of the voltage profile and the voltage window occurs in a desired SOC range in which the second battery module is operated within the battery system.

In accordance with the present disclosure, systems and methods are provided for matching the voltage of multiple battery modules in a battery system based on a combination of lithium ion chemistries, for example by incorporating multiple lithium ion chemistries into a single lithium ion battery module. As will be discussed in greater detail below, both the numbers and the chemistries of the battery cells (e.g., chemistries of lithium ion battery cells) may be varied for a second battery module (e.g., varied within a single battery module) to voltage match a first battery module. As such, the design flexibility for battery modules may be greatly increased. Accordingly, better performance and/or lower cost in battery system design may be achieved. In addition, as will be discussed below, not only the output voltage but also the state of charge may be considered in matching the second battery module to the first battery module in accordance with the present disclosure. Accordingly, the overall performance, such as charging efficiency, of the battery system may be enhanced.

To simplify the following discussion, the present techniques will be described in relation to a battery system with a 12 V lead-acid battery (e.g., as a first battery module) and a 12 V lithium ion battery (e.g., as a second battery module). However, the present techniques are also applicable to other battery systems, such as a battery system with a different output voltage (e.g., 48 V, 96 V).

Figure 1:
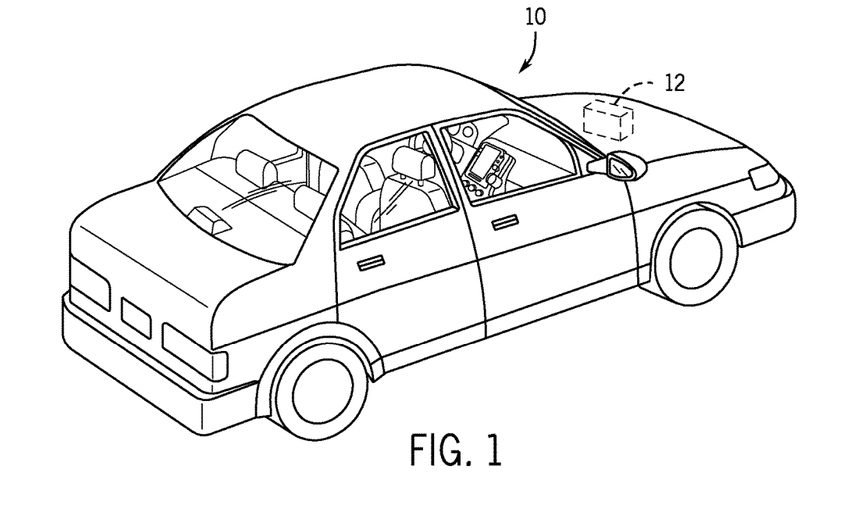
FIG. 1 is a perspective view of a vehicle (e.g., a mHEV) having a battery system, in accordance with an embodiment of the present disclosure.

With the foregoing in mind, FIG. 1 is a perspective view of an embodiment of a vehicle 10, such as a micro-hybrid vehicle. Although the following discussion is presented in relation to micro-hybrid vehicles, the techniques described herein are adaptable to other vehicles that capture/store electrical energy with a battery, which may include electric-powered and gas-powered vehicles.

It may be desirable for a battery system 12 to be largely compatible with traditional vehicle designs. Accordingly, the battery system 12 may be placed in a location in the vehicle 10 that would have housed a traditional battery system. For example, as illustrated, the vehicle 10 may include the battery system 12 positioned similarly to a lead-acid battery of a typical combustion-engine vehicle (e.g., under the hood of the vehicle 10). Furthermore, as will be described in more detail below, the battery system 12 may be positioned to facilitate managing temperature of the battery system 12. For example, in some embodiments, positioning a battery system 12 under the hood of the vehicle 10 may enable an air duct to channel airflow over the battery system 12 and cool the battery system 12.

Figure 2:
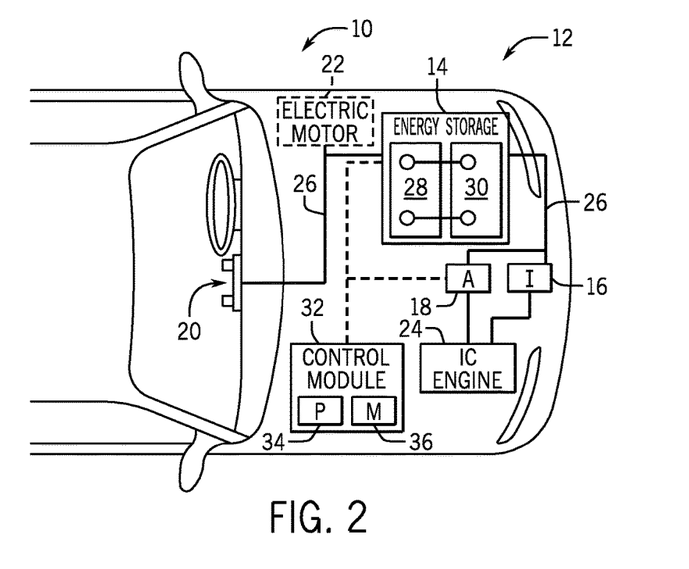
FIG. 2 is a cutaway schematic view of the vehicle of FIG. 1 having a battery system, in accordance with an embodiment of the present disclosure.

A more detailed view of the battery system 12 is described in FIG. 2. As depicted, the battery system 12 includes an energy storage component 14 coupled to an ignition system 16, an alternator 18, a vehicle console 20, and optionally to an electric motor 22. Generally, the energy storage component 14 may capture/store electrical energy generated in the vehicle 10 and output electrical energy to power electrical devices in the vehicle 10.

In other words, the battery system 12 may supply power to components of the vehicle's electrical system, which may include radiator cooling fans, climate control systems, electric power steering systems, active suspension systems, auto park systems, electric oil pumps, electric super/turbochargers, electric water pumps, heated windscreen/defrosters, window lift motors, vanity lights, tire pressure monitoring systems, sunroof motor controls, power seats, alarm systems, infotainment systems, navigation features, lane departure warning systems, electric parking brakes, external lights, or any combination thereof. In the depicted embodiment, the energy storage component 14 supplies power to the vehicle console 20 and the ignition system 16, which may be used to start (e.g., crank) the internal combustion engine 24.

Additionally, the energy storage component 14 may capture electrical energy generated by the alternator 18 and/or the electric motor 22. In some embodiments, the alternator 18 may generate electrical energy while the internal combustion engine 24 is running. More specifically, the alternator 18 may convert the mechanical energy produced by the rotation of the internal combustion engine 24 into electrical energy. Additionally or alternatively, when the vehicle 10 includes an electric motor 22, the electric motor 22 may generate electrical energy by converting mechanical energy produced by the movement of the vehicle 10 (e.g., rotation of the wheels) into electrical energy. Thus, in some embodiments, the energy storage component 14 may capture electrical energy generated by the alternator 18 and/or the electric motor 22 during regenerative braking. As such, the alternator and/or the electric motor 22 are generally referred to herein as a regenerative braking system.

To facilitate capturing and supplying electric energy, the energy storage component 14 may be electrically coupled to the vehicle's electric system via a bus 26. For example, the bus 26 may enable the energy storage component 14 to receive electrical energy generated by the alternator 18 and/or the electric motor 22. Additionally, the bus 26 may enable the energy storage component 14 to output electrical energy to the ignition system 16 and/or the vehicle console 20. Accordingly, when a 12 V battery system 12 is used, the bus 26 may carry electrical power typically between 8-18 V.

Additionally, as depicted, the energy storage component 14 may include multiple battery modules. For example, in the depicted embodiment, the energy storage component 14 includes a lithium ion (e.g., a second) battery module 28 and a lead-acid (e.g., a first) battery module 30, which each includes one or more battery cells. In other embodiments, the energy storage component 14 may include any number of battery modules. Additionally, although the lithium ion battery module 28 and lead-acid battery module 30 are depicted adjacent to one another, they may be positioned in different areas around the vehicle. For example, the lead-acid battery module may be positioned in or about the interior of the vehicle 10 while the lithium ion battery module 28 may be positioned under the hood of the vehicle 10.

In some embodiments, the energy storage component 14 may include multiple battery modules to utilize multiple different battery chemistries. For example, when the lithium ion battery module 28 is used, performance of the battery system 12 may be improved since the lithium ion battery chemistry generally has a higher coulombic efficiency and/ or a higher power charge acceptance rate (e.g., higher maximum charge current or charge voltage) than the lead-acid battery chemistry. As such, the capture, storage, and/or distribution efficiency of the battery system 12 may be improved.

To facilitate controlling the capturing and storing of electrical energy, the battery system 12 may additionally include a control module 32. More specifically, the control module 32 may control operations of components in the battery system 12, such as relays (e.g., switches) within energy storage component 14, the alternator 18, and/or the electric motor 22. For example, the control module 32 may regulate amount of electrical energy captured/supplied by each battery module 28 or 30 (e.g., to de-rate and re-rate the battery system 12), perform load balancing between the battery modules 28 and 30, determine a state of charge of each battery module 28 or 30, determine temperature of each battery module 28 or 30, control voltage output by the alternator 18 and/or the electric motor 22, and the like.

Accordingly, the control unit 32 may include one or more processors 34 and one or more memory 36. More specifically, the one or more processors 34 may include one or more application specific integrated circuits (ASICs), one or more field programmable gate arrays (FPGAs), one or more general purpose processors, or any combination thereof. Additionally, the one or more memory 36 may include volatile memory, such as random access memory (RAM), and/or non-volatile memory, such as read-only memory (ROM), optical drives, hard disc drives, or solid-state drives. In some embodiments, the control unit 32 may include portions of a vehicle control unit (VCU) and/or a separate battery control module. Furthermore, as depicted, the lithium ion battery module 28 and the lead-acid battery module 30 are connected in parallel across their terminals. In other words, the lithium ion battery module 28 and the lead-acid module 30 may be coupled in parallel to the vehicle's electrical system via the bus 26.

Figure 3:
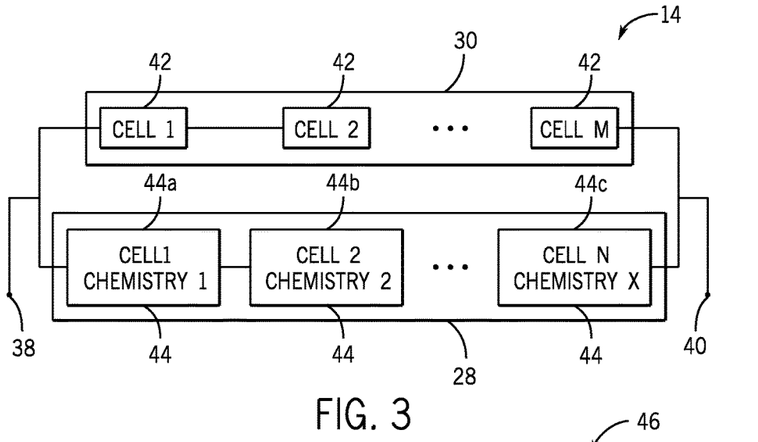
FIG. 3 is a schematic diagram of an embodiment of the energy storage component that includes multiple voltage matched battery modules, in accordance with an embodiment of the present disclosure.

As noted above, the first battery module 30 and the second battery module 28 may be connected in various parallel architectures. For example, FIG. 3 illustrates schematically an embodiment of the energy storage component 14 where the first battery module 30 and the second battery module 28 are connected in parallel with one another and directly coupled to terminals (e.g., a first terminal 38 and a second terminal 40) of the energy storage component 14. The battery terminals 38, 40 may output power stored in the energy storage component 14 to provide power to electrical devices in the vehicle 10. Additionally, the battery terminals 38, 40 may also provide power to the energy storage component 14 to enable the first battery module 30 and the second battery module 28 to receive charge from, for example, the alternator 18 and/or power the electric motor 22. In some embodiments, the second terminal 40 may provide a ground connection, and the first terminal 38 may provide a positive voltage ranging between 7-18 V.

As illustrated, the first battery module 30 may include m battery cells 42 (e.g., connected in series), where m may be any integer number, such as 1, 2, 3, 4, 5, 6, 7, 8, 9, 10, or more. The first battery module 30 may have a first voltage profile (e.g., open circuit voltage as a function of SOC). For example, the first battery module 30 may be a 12 V lead-acid battery that includes m=6 lead-acid battery cells 42 and may have the open circuit voltage ranging between, for example, 11.2-13.0 V in a SOC range of between approximately 0% to 100%. The second battery module 28 may have a second voltage profile. By way of example, the second battery module 28 may have voltage ranging between 11.8-16 V in a SOC range of between approximately 0% to 100%.

In accordance with the present disclosure, the second battery module 28 may be voltage matched to the first battery module 30 by varying both the number and the chemistry of the battery cells within the second battery module 28. As illustrated, the second battery module 28 includes n battery cells 44 (e.g., 44a, 44b, 44c, and so on) connected in series, where n may be any integer number, such as 1, 2, 3, 4, 5, 6, 7, 8, 9, 10, or more. In one aspect, all of the battery cells 44 in the second battery module 28 do not have the same chemistry. In other words, at least one of the battery cells 44 in the second battery module 28 has a different chemistry from at least one of the other battery cells 44 in the second battery module 28. For instance, battery cell 44a may have a different battery chemistry (e.g., a different combination of a cathode active material and an anode active material) than battery cell 44b.

Each of the battery cells 44 in the second battery module 28 may be any type of lithium ion battery cells, thereby having any suitable chemistry (e.g., a combination of cathode active material and anode active material). As used herein, a lithium ion battery cell may be represented by denoting its main cathode active material/anode active material. For example, a NMC/LTO battery cell refers to a battery cell having a lithium nickel manganese cobalt oxide (NMC) cathode active material and a lithium-titanate (LTO) anode active material. By way of example, the cathode active material of any of the battery cells 44 may be a lithium metal oxide (LMO) component. As used herein, lithium metal oxides may refer to any class of materials whose formula includes lithium and oxygen as well as one or more additional metal species (e.g., nickel, cobalt, manganese, aluminum, iron, or another suitable metal). A non-limiting list of example LMOs may include: mixed metal compositions including lithium, nickel, manganese, and cobalt ions such as lithium nickel cobalt manganese oxide (NMC) (e.g., $LiNi_{1/3}Co_{1/3}Mn_{1/3}O_2$), lithium nickel cobalt aluminum oxide (NCA) (e.g., $LiNi_{0.8}Co_{0.15}Al_{0.05}O_2$), lithium cobalt oxide (LCO) (e.g., $LiCoO_2$), and lithium metal oxide spinel (LMO-spinel) (e.g., $LiMn_2O_4$). The cathode may include only a single active material (e.g., NMC), or may include a mixture of materials such as any one or a combination of: NMC, NCA, LCO, LMO-spinel, and the like. Other cathode active materials may be utilized in addition to or in lieu of these materials, such as lithium metal phosphates. Examples of such active materials are generally defined by the formula $LiMPO_4$, wherein M is Fe, Ni, Mn, or Mg. Any one or a combination of these phosphates may be used as the cathode active material, in addition to or in lieu of any one or a combination of the lithium metal oxide materials encompassed by the description above. Thus, the cathode active material may include any one or a combination of: NMC ($Li_xNi_aMn_bCo_cO_2$, x+a+b+c=2), $LiMn_2O_4$ (LMO) spinel, NCA ($LiNi_xCo_yAl_zO_2$, x+y+z=1), $LiMn_{1.5}Ni_{0.5}O_2$, $LiCoO_2$ (LCO), or $LiMPO_4$, wherein M is Fe, Ni, Mn, or Mg. The anode active material of any of the battery cells 44 may generally include any one or a combination of materials, such as carbon (e.g., graphite), titanium dioxide ($TiO_x$ or otherwise denoted as $TiO_2$), or lithium titanium oxide, also referred to herein as LTO ($Li_4Ti_5O_{12}$). The anode active material may include any one or a combination of these and other active materials.

Because different battery chemistries may result in different voltage characteristics (e.g., open circuit voltage) of battery cells, by including more than one battery chemistry in the second battery module 28, battery modules can be designed to benefit from the characteristics of the different chemistries. In other words, a voltage profile (voltage as a function of SOC) can be designed to achieve a particular result. The voltage profile may be designed to be relatively flat within a desired SOC range (an SOC range in which the second battery module 28 will be operated in the battery system 12), or may be designed to have steep slopes to achieve different charging and discharging characteristics within the desired SOC range and also within a voltage window of the battery system 12 (a range of voltages in which the battery system 12 is intended to operate). In addition, by varying the number of the battery cells 44 for each different chemistries, one additional degree of freedom is provided in selecting battery cells 44 for voltage matching between the second battery module 28 and the first battery module 30.

As such, for the second battery module 28 to voltage match the first battery module 30, the battery cells 44 of the second battery module 28 may be selected combinatorially based on the number (e.g., more than one) of the chemistries and the number of the battery cells 44. More specifically, the total number of the battery cells 44 in the battery module 28, the total number (e.g., more than one) of chemistries in the battery module 28, and the number of battery cells 44 for each chemistry may be varied for the second battery module 28 to voltage match the first battery module 30. By way of example, if the first battery module 30 has an open circuit voltage of 12 V at a certain SOC, the second battery module 28 may include, in series, two battery cells 44 with a first chemistry having an open circuit voltage of 3 V, and three battery cells with a second chemistry having an open circuit voltage of 2 V, which may provide the second battery module 28 with an overall open circuit voltage of 12 V at the same or a different SOC. Alternatively, the second battery module 28 may include, in series, one battery cell 44 with a first chemistry having an open circuit voltage of 3 V, four battery cells with a second chemistry having an open circuit voltage of 2 V, and one battery cell 44 with a third chemistry having an open circuit voltage of 1 V, which may also provide the second battery module 28 with an open circuit voltage of 12 V at the same or a different SOC. Also, the voltages described herein may be open circuit voltages, average voltages determined at a discharge rate (e.g., C/10), or any other measure of voltage.

While in the illustrated embodiment the battery cells 44 in the second battery module 28 are connected in series with one another, in some embodiments, the battery cells 44 in the second battery module 28 may be connected with one another in various other configurations, such as in parallel, or a combination of in series and in parallel. For example, multiple battery cells 44 having a same chemistry may be connected with one another in parallel, and then connected with one or more battery cells 44 having a different chemistry.

Figure 4:
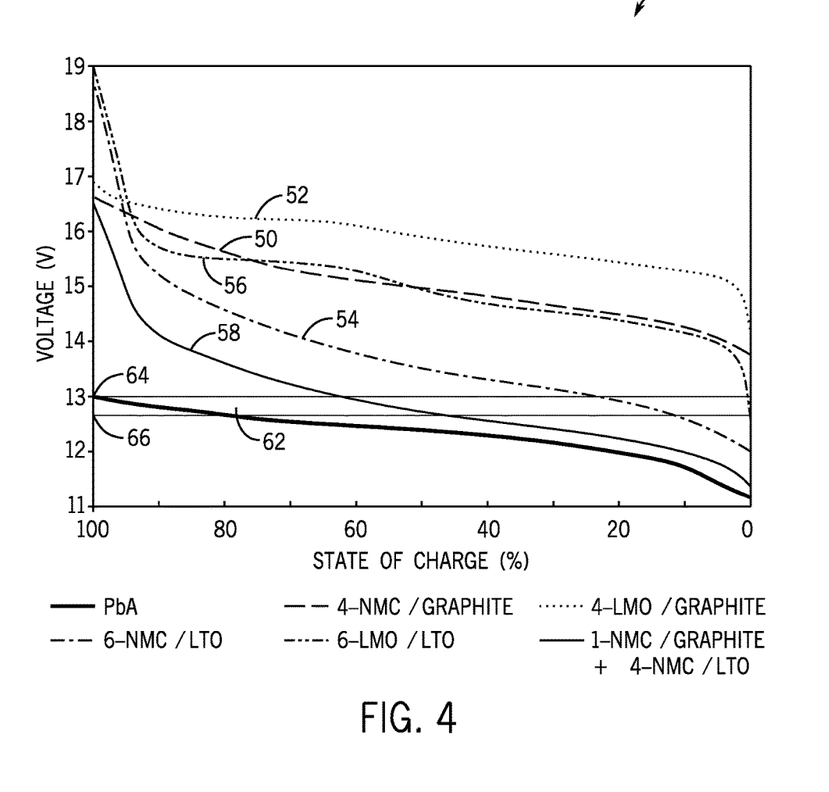
FIG. 4 is a chart of voltage characteristics for various battery modules, in accordance with an embodiment of the present disclosure.

As noted above, the voltage profile of each of the first battery module 30 and the second battery module 28 may depend on their respective states of charge. FIG. 4 is a chart 46 of voltage characteristics (e.g., voltage profiles) for various battery modules. More specifically, FIG. 4 is a plot depicting the open circuit voltage of a first battery module 30 or a second battery module 28 (utilizing various combinations of numbers and chemistries of the battery cells 44) over the respective battery module's total state of charge range (e.g., from 0% state of charge to 100% SOC). FIG. 4 illustrates the SOC (in %) on the X-axis and the open circuit voltage (in V) on the Y-axis.

As illustrated, the chart 46 includes a lead-acid (PbA) voltage profile 48 depicting the open circuit voltage for the first battery module 30 (e.g., the lead-acid battery) in a range of SOC (e.g., 0% to 100%). The chart 46 also includes various voltage profiles depicting the open circuit voltages in a range of SOC (e.g., 0% to 100%) for the second battery module 28 (e.g., the lithium ion battery) utilizing various combinations of numbers and chemistries of the battery cells 44, including a 4-NMC/graphite voltage profile 50, a 4-LMO/graphite voltage profile 52, a 6-NMC/LTO voltage profile 54, a 6-LMO/LTO voltage profile 56, and a 1-NMC/graphite+4-NMC/LTO voltage profile 58. As used herein, "4-NMC/graphite" refers to the second battery module 28 having four NMC/graphite battery cells 44; "4-LMO/graphite" refers to the second battery module 28 having four LMO/graphite battery cells 44; "6-NMC/LTO" refers to the second battery module 28 having six NMC/LTO battery cells 44; "6-LMO/LTO" refers to the second battery module 28 having six LMO/LTO battery cells 44; and "1-NMC/graphite+4-NMC/LTO" refers to the second battery module 28 having one NMC/graphite battery cell 44 and four NMC/LTO battery cells 44.

As illustrated in FIG. 4, the voltage of each battery module may vary with its SOC. For the purposes of explaining an aspect of the present disclosure, the first battery module 30 is described below as being a, lead-acid (PbA) battery. For the PbA battery (first battery module 30 in FIG. 4), the PbA voltage profile 48 shows that the first battery module 30 at 0% state of charge may have a voltage of 11.2 V, at 50% state of charge may have a voltage of 12.2 V, and at 100% state of charge may have a voltage of 13.0 V. In other words, the first battery module 30 has a voltage range of 11.2-13.0 V. FIG. 4 also includes a voltage window 62 of the first battery module 30. In the illustrated embodiment, the voltage window 62 includes an upper voltage limit 64 (e.g., about 13.0 V, corresponding to about 100% SOC) and a lower voltage limit 66 (e.g., about 12.6 V, corresponding to about 80% SOC). However, it should be noted that other embodiments of the first battery module 30 may have a different range for the voltage window 62 (e.g., with any suitable upper voltage limit 64 and lower voltage limit 66, covering any suitable range of SOC), depending on the chemistry of the first battery module 30.

As also illustrated in FIG. 4, the second battery module 28 may be designed to include various combinations of battery cell chemistries, resulting in different voltage characteristics (e.g., whether and how the voltage profile of the second battery module 28 results in voltage matching to the first battery module 30). For example, the 4-NMC/graphite voltage profile 50 does not overlap with the voltage window 62 (e.g., 12.6-13.0 V) as the 4-NMC/graphite voltage profile 50 has its lowest voltage of approximately 13.6 V at 0% SOC. Accordingly, in this example, the first battery module 30 and the second battery module 28 are not voltage matched (e.g., with respect to the voltage window 62 of the first battery module 30). Similarly, the 4-LMO/graphite voltage profile 52 does not overlap with the voltage window 62 (e.g., 12.6-13.0 V) as the 4-LMO/graphite voltage profile 52 has its lowest voltage of approximately 14.0 V at 0% SOC. Accordingly, again, the first battery module 30 and the second battery module 28 are not voltage matched. When the second battery module 28 is not voltage matched to the first battery module 30, the energy storage component 14 may not function efficiently, for example, during charging, the second battery module 28 may not have good charge accepting capacity (e.g., the voltage of the second battery module 28 at 0% SOC is higher than the upper voltage limit 64 of the voltage window 62 of the first battery module 30).

The second battery module 28 having six NMC/LTO battery cells 44 and the second battery module 28 having six LMO/LTO battery cells 44 are both better voltage matched to the first battery module 30 compared to the above two examples: (1) the second battery module 28 having four NMC/graphite battery cells 44 and (2) the second battery module 28 having four LMO/graphite battery cells 44. For example, the 6-NMC/LTO voltage profile 54 overlaps with the voltage window 62 (e.g., 12.6-13.0 V) in a SOC range of about 10% to 25% as the 6-NMC/LTO voltage profile 54 has a voltage of approximately 12.6 V at about 10% SOC and a voltage of approximately 13.0 V at about 25% SOC. However, operating the second battery module 28 (for the embodiment having six NMC/LTO battery cells 44) in the range of relatively low SOC (e.g., below 25% SOC) may result in low discharge capability, which can, in certain implementations, decrease the overall performance of the battery system 12.

Similarly, as illustrated in FIG. 4, the 6-LMO/LTO voltage profile 56 overlaps with the voltage window 62 (e.g., 12.6-13.0 V) in a SOC range of about 0% to 2% as the 6-LMO/LTO voltage profile 56 has a voltage of approximately 12.6 V at about 0% SOC and a voltage of approximately 13.0 V at about 2% SOC. Operating the second battery module 28 (having six LMO/LTO battery cells 44) in the range of relatively low SOC (e.g., below 2% SOC), again, may result in low discharge capability, therefore decreasing the overall performance of the energy storage component 14.

Comparatively, FIG. 4 illustrates that the second battery module 28 having one NMC/graphite battery cell 44 and four NMC/LTO battery cells 44 is better voltage matched to the first battery module 30. For example, the 1-NMC/graphite+4-NMC/LTO voltage profile 58 overlaps with the voltage window 62 (e.g., 12.6-13.0 V) in a SOC range of about 45% to 60% as the 1-NMC/graphite+4-NMC/LTO voltage profile 58 has a voltage of approximately 12.6 V at about 45% SOC and a voltage of approximately 13.0 V at about 60% SOC. Because the second battery module 28 having one NMC/graphite battery cell 44 and four NMC/LTO battery cells 44 is voltage matched with the first battery module 30 (e.g., with respect to the voltage window 62) about 50% SOC (e.g., between about 45% to 50% SOC), the second battery module 28 may have a good balance of both charging and discharging capacity, which may result in an improved performance of the energy storage component 14.

Accordingly, to improve voltage matching of the second battery module 28 to the first battery module 30, the particular combination of the battery cells 44 (e.g., the number and the chemistries) of the second battery module 28 may be at least partially based on overlapping between voltage characteristics (e.g., the open circuit voltage profile) of the second battery module 28 and voltage characteristics (e.g., the voltage window) of the first battery module 30. Indeed, as discussed above, the second battery module 28 having one NMC/graphite battery cell 44 and four NMC/LTO battery cells 44 is better voltage matched to the first battery module 30 compared to other examples of the second battery module (e.g., having four NMC/graphite battery cells 44, having four LMO/graphite battery cells 44, having six NMC/LTO battery cells 44, and having six LMO/LTO battery cells 44) because the open circuit voltage of the second battery module 28 having one NMC/graphite battery cell 44 and four NMC/LTO battery cells 44 overlap with the voltage window 62 of the first battery module 30 at a relatively middle portion of the SOC range (e.g., between about 45% to 60%). However, it should be noted that in some embodiments, it may be desirable to have a second battery module 28 that voltage matches the first battery module 30 at any suitable range (or value) of SOC, such as between about 0% to 100%, between about 10% to 90%, between about 20% to 80%, between about 30% to 70%, between about 40% to 60%, between about 0% to 20%, between about 20% to 40%, between about 60% to 80%, or between about 80% to 100%. Thus, the combination of battery cells 44, including the numbers and the chemistries, for the second battery module 28 may be based on the voltage match between the second battery module 28 and the first battery module 30 at a desired SOC range or about a desired SOC value.

It should be noted that while one example (e.g., the second battery module 28 having one NMC/graphite battery cell 44 and four NMC/LTO battery cells 44) is provided in FIG. 4, the method described herein may be used to select or design various other combinations of battery cells 44, including the total number of the battery cells 44 in the second battery module 28, the total number (e.g., more than one) of chemistries in the second battery module 28, and the number of battery cells 44 for each chemistry, for voltage matching of the second battery module 28 and the first battery module 30.

In accordance with another aspect of present disclosure, particular combinations (e.g., the numbers and chemistries) of the battery cells 44 in the second battery module 28 may be based on matching the voltage characteristics (e.g., the open circuit voltage profile) of the second battery module 28 to an operating window of the energy storage component 14 in which the first battery module 30 and the second battery module 20 are intended to function. The operating window of the energy storage component 14 may include a range of voltage (e.g., specified by a manufacture) in which the energy storage component 14 generally operates. The operating window of the energy storage component 14 may depend on characteristics (e.g., open circuit profile) of the first battery module 30. By way of example, when the first battery module 30 is a 12 V lead-acid battery module, which has an open circuit range of 11.2-13.0 V, the operating window of the energy storage component 14 may be, for example, 10.5-16.0 V, 12.0-14.8 V, 12.0-14.4 V, or 12.0-14.0 V. The combinations (e.g., the numbers and chemistries) of the battery cells 44 in the second battery module 28 may be based on the matching (e.g., overlap) of the open circuit voltage profile of the second battery module 28 and the operating window of the energy storage component 14.

Figure 5:
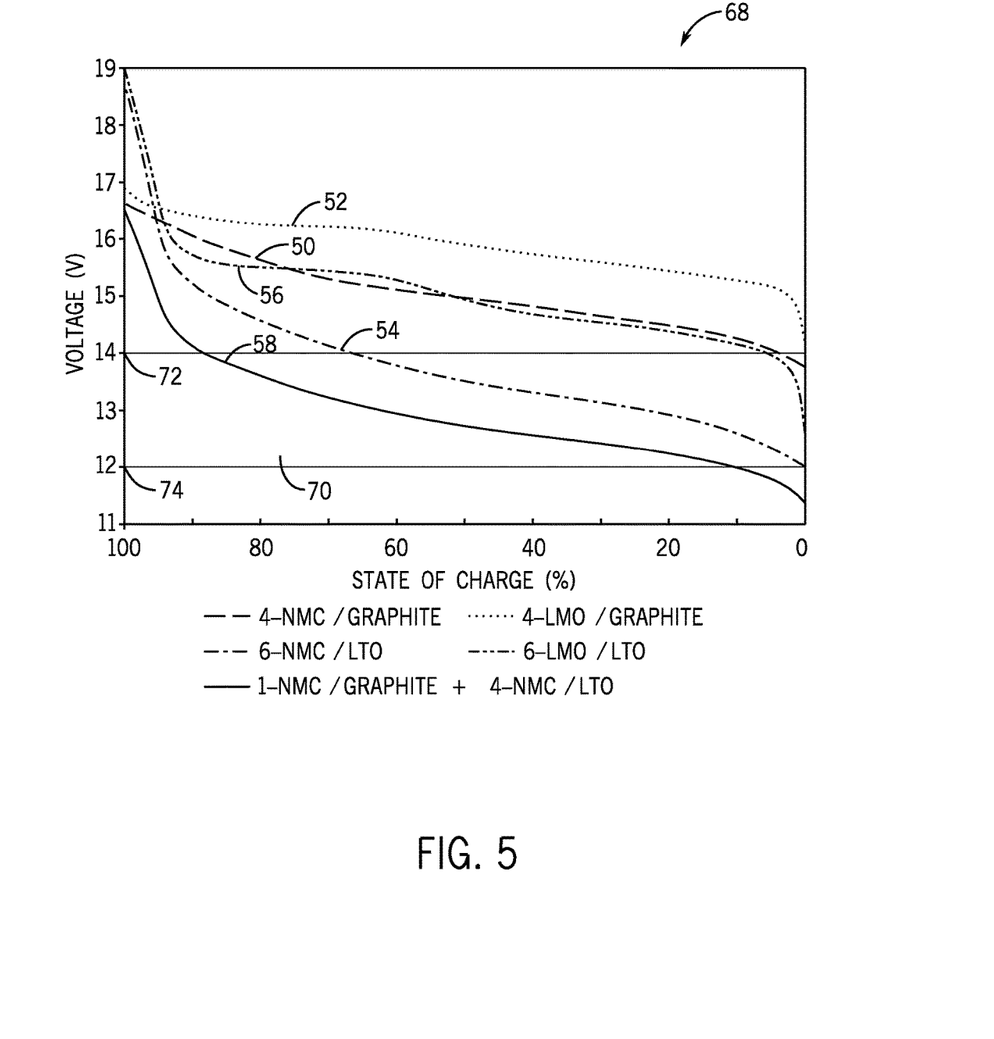
FIG. 5 is a chart of voltage characteristics for various battery modules, in accordance with an embodiment of the present disclosure.

For example, FIG. 5 is a chart 68 of voltage characteristics for various second battery modules 28 with respect to an operating window 70 of the energy storage component 14. More specifically, FIG. 5 depicts the open circuit voltage profiles of various second battery modules 28 (same as in FIG. 4) with respect to the operating voltage window 70 that has an upper voltage limit 72 of about 14.0 V and a lower voltage limit 74 of about 12.0 V. However, as noted above, the energy storage component 14 may have any suitable operating window 70 (e.g., with any suitable upper voltage limit 72 and lower voltage limit 74) that may depend on characteristics (e.g., open circuit profile) of the first battery module 30.

A specific combination (e.g., the numbers and chemistries) of the battery cells 44 within the second battery module 28 may result in a particular open circuit profile of the second battery module 28, which may overlap with the operating window 70 in a particular manner (e.g., overlapping in a particular range of SOC). The particular manner of such overlapping may in turn determine the performance of the second battery module 28 (and consequently the energy storage component 14). Accordingly, combinations (e.g., the numbers and chemistries) of the battery cells 44 may be tuned so as to provide a particular second battery module 28 for a desired performance. More specifically, if a higher charging power of the second battery module 28 is desired, the combination of the battery cells 44 may be provided such that the voltage profile overlaps a respective voltage profile (or respective voltage window) of the first battery module 30 at a relatively lower SOC range (e.g., about 0% to 30%, about 5% to 25%, or about 10% to 20%), so that the second battery module 28 has a higher charging capability within the operating window 70. If a higher discharging power of the second battery module 28 is desired, the combination of the battery cells 44 may be provided such that the voltage profile overlaps a respective voltage profile (or respective voltage window) of the first battery module 30 at a relatively higher SOC range (e.g., about 70% to 100%, about 75% to 95%, or about 80% to 90%), so that the second battery module 28 has a higher discharging capability within the operating window 70. If a balance of high charging and discharging power of the second battery module 28 is desired, the combination of the battery cells 44 (e.g., combinations of battery cells 44a, 44b, 44c, and so on) may be provided such that the voltage profile overlaps a respective voltage profile (or respective voltage window) of the first battery module 30 at a relatively middle portion of the SOC range (e.g., about 30% to 70%, about 35% to 65%, about 40% to 60%, or about 45% to 55%), so that the second battery module 28 has a balanced charging and discharging capability within the operating window 70.

By way of specific examples, FIG. 5 illustrates that the 4-LMO/graphite voltage profile 52 barely overlaps with the operating window 70 (e.g., 12.0-14.0 V) as the 4-LMO/graphite voltage profile 52 has its lowest voltage of approximately 14.0 V at 0% SOC. Accordingly, in this example, the second battery 28 may not provide a good charging capacity to the energy storage component 14 because the second battery 28 barely has any charging capacity (e.g., about 0% SOC) at the upper voltage limit 72 of the operating window 70.

Also as illustrated in FIG. 5, both of the 4-NMC/graphite voltage profile 50 and the 6-LMO/LTO voltage profile 56 overlap with the operating window 70 (e.g., 12.0-14.0 V) in a SOC range of about 0% to 5%. The profiles 50, 56 show that although the 4-NMC/graphite and 6-LMO/LTO battery module examples are a better match than the 4-LMO/graphite battery module example, they still have a limited charging and discharging power within the operating window 70, and may not function efficiently in this window 70.

On the other hand, both the second battery module 28 having six NMC/LTO battery cells 44 and the second battery module 28 having one NMC/graphite battery cell 44 and four NMC/LTO battery cells 44 may provide a more efficient overall performance of the energy storage component 14 compared to the above three second battery modules 28. For example, the 6-NMC/LTO voltage profile 54 overlaps with the operating window 70 (e.g., 12.0-14.0 V) in a SOC range of about 0% to 70% (e.g., with an overall about 70% operating SOC). The 1-NMC/graphite+4-NMC/LTO voltage profile 58 overlaps with the operating window 70 (e.g., 12.0-14.0 V) in a SOC range of about 10% to 90% (e.g., with an overall about 80% operating SOC). As such, because both the second battery module 28 having six NMC/LTO battery cells 44 and the second battery module 28 having one NMC/graphite battery cell 44 and four NMC/LTO battery cells 44 have voltage profiles that respectively overlap with the operating window 70 in a relatively middle portion of the SOC range, both may provide a relatively balanced charging and discharging power. In addition, because both of the second battery modules 28 have a relatively large overall SOC operating range (e.g., 70% and 80%, respectively) within the operating window 70, both may result in more efficient overall performance of the energy storage component 14.

Figure 6:
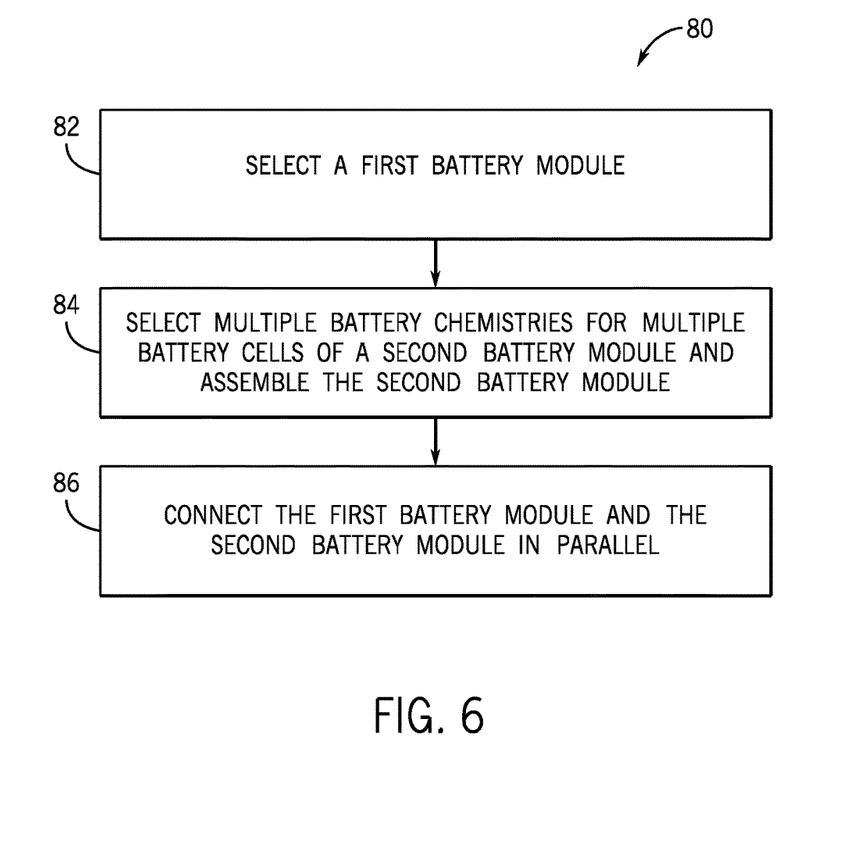
FIG. 6 is a flow diagram of a method for making an energy storage component that includes multiple voltage matched battery modules, in accordance with the present disclosure.

FIG. 6 is a flow diagram of an embodiment of a method 80 for making the energy storage component 14 that includes multiple battery modules (e.g., the first battery module 30 and the second battery module 28), in accordance with the present disclosure. In the illustrated embodiment, the method 80 includes selecting the first battery module 30 (block 82). The first battery module 30 may be any type of energy storage unit, including, but not limited to, a battery module (e.g., lead-acid battery module, lithium ion battery module, or the like), a capacitor, an ultracapacitor, or any combination thereof. As discussed above, the first battery module 30 may include one or more battery cells 42. As a specific example, the first battery module 30 may be a 12V lead-acid battery.

The second battery module 28 may be connected with the first battery module 30, both of which may be directly coupled to the terminals 38, 40 of the energy storage component 14. The second battery module 28 may include multiple battery cells 44. As discussed above, the second battery module 28 may include more than one chemistry, and the battery cells 44 of the second battery module 28 may be selected, by varying both the number (e.g., the total number of the battery cells 44, and the respective number of the battery cells with each chemistry) and the chemistries of the battery cells 44, to voltage match the first battery module (block 84). As discussed in detail above, the combination of the battery cells 44, including the number and the chemistries, for the second battery module 28 may be based on the overlap between the voltage profile of the second battery module 28 and the voltage window 62 of the first battery module 30 (e.g., within a desired range of SOC). In addition, the combination of the battery cells 44, including the number and the chemistries, for the second battery module 28 may be based on the overlap between the voltage profile of the second battery module 28 and the operating window 70 of the energy storage component 14 (e.g., within a desired range of SOC). Once the battery cells 44 of the second battery module are selected, these battery cells 44 may be assembled (e.g., in series, in parallel, or a combination thereof) to form the second battery module 28. The second battery module 28 and the first battery module 30 may then be connected (e.g., in parallel) to form the energy storage component 14 (block 86).

One or more of the disclosed embodiments, alone or on combination, may provide one or more technical effects including matching one battery module to another battery module in a batter system. Combinations in both numbers and chemistries of battery cells within the one battery module may be tuned for voltage matching. Such tuning combinations of the battery cells may provide increased design flexibility for battery modules. The technical effects and technical problems in the specification are exemplary and are not limiting. It should be noted that the embodiments described in the specification may have other technical effects and can solve other technical problems.

While only certain features and embodiments in accordance with the present disclosure have been illustrated and described, many modifications and changes may occur to those skilled in the art (e.g., variations in sizes, dimensions, structures, shapes and proportions of the various elements, values of parameters (e.g., temperatures, pressures, etc.), mounting arrangements, use of materials, colors, orientations, etc.) without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the present disclosure. Furthermore, in an effort to provide a concise description of the exemplary embodiments, all features of an actual implementation may not have been described (i.e., those unrelated to the presently contemplated best mode of carrying out the disclosure, or those unrelated to enabling the disclosure). It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A micro-hybrid battery system, comprising:
   a lithium ion battery module configured to be coupled to an electrical load, wherein the lithium ion battery module comprises:
   a housing;
   a first lithium ion battery cell disposed in the housing and having a lithium nickel manganese cobalt oxide (NMC) cathode active material and a lithium-titanate (LTO) anode active material;
   a second lithium ion battery cell electrically connected in series to the first lithium ion battery cell and disposed in the housing, wherein the second lithium ion battery cell has a NMC cathode active material and a graphite anode active material, wherein the first and second active material chemistries are different such that the first and second lithium ion battery cells have different open circuit voltages; and
   an energy storage unit electrically coupled in parallel to the lithium ion battery module, and wherein the energy storage unit and the lithium ion battery module are voltage matched, wherein the lithium ion battery module comprises a plurality of lithium ion battery cells having the first and second lithium ion battery cells, wherein the number of first lithium ion battery cells is greater than the number of second lithium ion battery cells, and the plurality of lithium ion battery cells is configured such that the lithium ion battery module has a voltage profile of voltage as a function of state of charge (SOC) that overlaps a voltage window of the energy storage unit, the overlap occurring within a first SOC range of the voltage profile in which the lithium ion battery module is intended to operate within the micro-hybrid battery system, wherein the voltage window of the energy storage unit corresponds to a second SOC range in which the energy storage unit is intended to operate within the micro-hybrid battery system.

2. The micro-hybrid battery system of claim 1, wherein the voltage profile of the lithium ion battery module overlaps an operating window of the micro-hybrid battery system, the overlap occurring within a SOC range of the voltage profile in which the lithium ion battery module is intended to operate within the micro-hybrid battery system, wherein the operating window of the micro-hybrid battery system depends at least on the energy storage unit.

3. The micro-hybrid battery system of claim 2, wherein the plurality of lithium ion battery cells is configured such that the voltage profile of the lithium ion battery module overlaps the operating window of the micro-hybrid battery system within a lower half of the SOC range.

4. The micro-hybrid battery system of claim 2, wherein the plurality of lithium ion battery cells is configured such that the voltage profile of the lithium ion battery module overlaps the operating window of the micro-hybrid battery system within an upper half of the SOC range.

5. The micro-hybrid battery system of claim 1, wherein the plurality of lithium ion battery cells is configured such that the voltage profile of the lithium ion battery module overlaps the voltage window of the energy storage unit within a lower half of the SOC range.

6. The micro-hybrid battery system of claim 1, wherein the plurality of lithium ion battery cells is configured such that the voltage profile of the lithium ion battery module overlaps the voltage window of the energy storage unit within an upper half of the SOC range.

7. The micro-hybrid battery system of claim 1, wherein the energy storage unit is a 12 V automotive lead acid battery and the lithium ion battery module is a micro-hybrid lithium ion battery module configured to capture electrical energy from a regenerative braking system of an xEV.

8. The micro-hybrid battery system of claim 1, wherein the energy storage unit comprises an ultracapacitor or an additional lithium ion battery module.

9. A micro-hybrid battery system, comprising:
   a first battery module; and
   a lithium ion battery module electrically connected in parallel with the first battery module and comprising multiple groups of lithium ion battery cells and multiple different lithium ion battery chemistries, wherein each of the multiple groups of lithium ion battery cells corresponds to one of the multiple different lithium ion battery chemistries, wherein each lithium ion battery cell of a first group of the multiple groups of lithium ion battery cells comprises a lithium nickel manganese cobalt oxide (NMC) cathode active material and a lithium-titanate (LTO) anode active material, wherein each lithium ion battery cell of a second group of the multiple groups of lithium ion battery cells comprises a NMC cathode active material and a graphite anode active material, and wherein the first group is electrically connected in series with the second group; and
   wherein the first battery module and the lithium ion battery module are voltage matched, and wherein the multiple groups of lithium ion battery cells are configured such that the lithium ion battery module has a voltage profile of voltage as a function of state of charge (SOC) that overlaps a voltage window of the first battery module, wherein the number of lithium ion battery cells in the first group is greater than the number of lithium ion battery cells in the second group, the overlap occurring within a first SOC range of the voltage profile in which the lithium ion battery module is intended to operate within the micro-hybrid battery system, wherein the voltage window of the first battery module corresponds to a second SOC range in which the first battery module is intended to operate within the micro-hybrid battery system.

10. The micro-hybrid battery system of claim 9, wherein the multiple groups of lithium ion battery cells are configured such that the voltage profile of the lithium ion battery module overlaps the voltage window of the first battery module within a lower half of the SOC range.

11. The micro-hybrid battery system of claim 9, wherein the multiple groups of lithium ion battery cells are configured such that the voltage profile of the lithium ion battery module overlaps the voltage window of the first battery module within an upper half of the SOC range.

12. The micro-hybrid battery system of claim 9, wherein the first battery module comprises an ultracapacitor or an additional lithium ion battery module.

13. A method for manufacturing a battery system, comprising:

assembling multiple lithium ion battery cells into a lithium ion battery module such that a first lithium ion battery cell of the multiple lithium ion battery cells comprises a different lithium ion battery chemistry from a second lithium ion battery cell of the multiple lithium ion battery cells, wherein assembling the multiple lithium ion battery cells into the lithium ion battery module comprises electrically connecting the first lithium ion battery cell and the second lithium ion battery cell in series, wherein the first lithium ion battery cell comprises a lithium nickel manganese cobalt oxide (NMC) cathode active material and a lithium-titanate (LTO) anode active material, and wherein the second lithium ion battery cell comprises a NMC cathode active material and a graphite anode active material, and wherein the number of first lithium ion battery cells in the lithium ion battery module is greater than the number of second lithium ion battery cells in the lithium ion battery module; and electrically connecting the lithium ion battery module with an additional battery module in parallel, wherein the multiple lithium ion battery cells are configured such that the lithium ion battery module is voltage matched with the additional battery module, wherein the multiple lithium ion battery cells are configured such that the lithium ion battery module has a voltage profile of voltage as a function of state of charge (SOC) that overlaps a voltage window of the additional battery module, the overlap occurring within a first SOC range of the voltage profile in which the lithium ion battery module is intended to operate within the battery system, wherein the voltage window of the additional battery module corresponds to a second SOC range in which the additional battery module is intended to operate within the battery system.

14. The method of claim 13, wherein electrically connecting the lithium ion battery module with the additional battery module in parallel comprises electrically connecting the lithium ion battery module with a 12V automotive lead-acid battery.

* * * * *